J. P. BERTRAND.
GARDEN TOOL.
APPLICATION FILED OCT. 7, 1918.
1,309,177. Patented July 8, 1919.
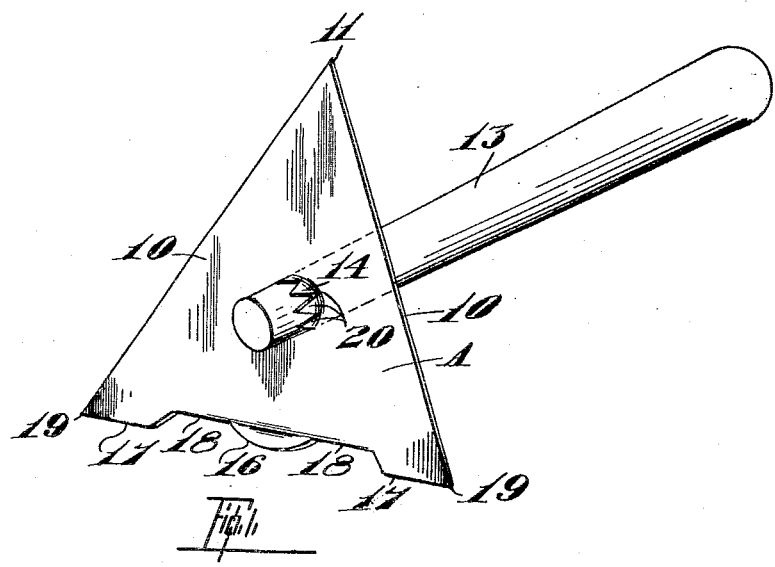
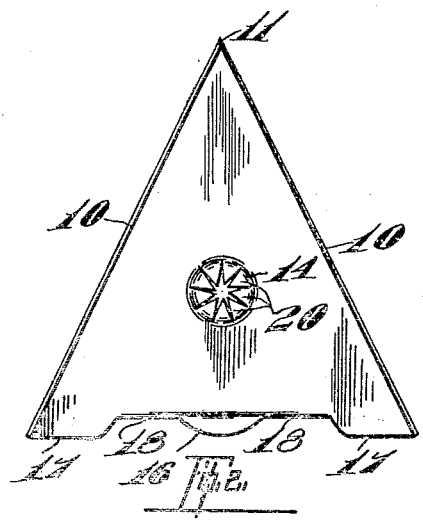
INVENTOR
J. P. BERTRAND
BY Fetherstonhaugh & Co
ATTY'S.

UNITED STATES PATENT OFFICE.

JOSEPH PLACIDE BERTRAND, OF PORT ARTHUR, ONTARIO, CANADA.

GARDEN-TOOL.

1,309,177.  Specification of Letters Patent.  Patented July 8, 1919.

Application filed October 7, 1918. Serial No. 257,262.

*To all whom it may concern:*

Be it known that I, JOSEPH PLACIDE BERTRAND, a subject of the King of Great Britain, and resident of Port Arthur, in the Province of Ontario, Dominion of Canada, have invented certain new and useful Improvements in Garden-Tools, of which the following is a specification.

This invention relates to improvements in garden tools, particularly adapted for planting and weeding, and the objects of the invention are to provide an inexpensive and very useful implement for the household garden.

With the above and other objects in view, the invention consists essentially of the improved construction particularly described and set forth in the following specification and accompanying drawings, forming part of the same.

In the drawings,

Figure 1 is a perspective view of the improved garden tool.

Fig. 2 is a plan view of the improved garden tool showing the method of cutting the handle socket.

In the specification like characters of reference refer to like parts in the drawings.

Referring to the drawings A represents the triangular body of a garden tool, provided with a plurality of cutting edges 10 tapering to a point 11.

The upper edge of the implement is cut away in such a manner as to form two grooves 18, with a central projection 16 therebetween and two outer projections 17, this projection being slightly bent in an outward direction, thus forming a filling or covering tool as part of the implement.

The projection 16 is adapted in use to leave a small trench at the top of the hill or over the seed just covered, so that rain may be able to more easily penetrate to the seed instead of running off the hill. The corners 19 are particularly adapted for cutting away weeds.

A handle socket 14 is located in the center of balance of the blade, and is cut out in a manner as to form teeth 20. These teeth are bent outward to form the socket for the handle 13, thereby eliminating waste of material.

It will be seen that by turning the point 11 of the tool, it may be used as a seed drill by pulling it over prepared ground to the required depth.

As many changes could be made in the above construction and many apparently widely different embodiments of my invention, within the scope of the claim, constructed without departing from the spirit or scope thereof, it is intended that all matter contained in the accompanying specification and drawings shall be interpreted as illustrative and not in a limiting sense.

What I claim as my invention is:

A garden implement comprising an angular blade having one edge formed with projecting corner portions, a groove at the inner side of each corner and a trench forming lip between the grooves, substantially as described.

In witness whereof I have hereunto set my hand in the presence of two witnesses.

JOSEPH PLACIDE BERTRAND.

Witnesses:
G. R. TAGGART,
M. M. PENNIMAN.

Copies of this patent may be obtained for five cents each, by addressing the "Commissioner of Patents, Washington, D. C."